(12) United States Patent
Watanabe et al.

(10) Patent No.: US 9,327,758 B2
(45) Date of Patent: May 3, 2016

(54) STEERING APPARATUS

(71) Applicant: Showa Corporation, Gyoda-shi (JP)

(72) Inventors: Naomasa Watanabe, Haga-gun (JP); Shinichi Sakaida, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/625,161

(22) Filed: Feb. 18, 2015

(65) Prior Publication Data

US 2016/0075368 A1    Mar. 17, 2016

(30) Foreign Application Priority Data

Sep. 12, 2014   (JP) ................. 2014-185806

(51) Int. Cl.
*B62D 5/00* (2006.01)
*B62D 5/04* (2006.01)

(52) U.S. Cl.
CPC ............ *B62D 5/0448* (2013.01); *B62D 5/0424* (2013.01)

(58) Field of Classification Search
CPC .. B62D 5/0448; B62D 5/0442; B62D 5/0445; B62D 5/0424
USPC ........................................................ 180/444
See application file for complete search history.

(56) References Cited

U.S. PATENT DOCUMENTS

| | | | | |
|---|---|---|---|---|
| 6,454,044 B1 * | 9/2002 | Menjak | ................ | B62D 5/0424 180/444 |
| 6,938,722 B2 * | 9/2005 | Sasaki | ................ | B62D 5/0424 180/443 |
| 7,189,176 B2 * | 3/2007 | Sakaida | ................ | B62D 5/0424 474/148 |
| 7,191,866 B2 * | 3/2007 | Sasaki | ................ | B62D 5/0424 180/443 |
| 7,278,334 B2 * | 10/2007 | Saruwatari | ........... | B62D 5/0412 180/444 |
| 7,360,624 B2 * | 4/2008 | Nagamatsu | .......... | B62D 5/0424 180/444 |
| 8,307,940 B2 * | 11/2012 | Bugosh | ................ | B62D 5/0448 180/443 |
| 8,479,605 B2 * | 7/2013 | Shavrnoch | ........... | B62D 5/0448 180/443 |
| 8,505,676 B2 * | 8/2013 | Yamamoto | ........... | B62D 5/0448 180/444 |
| 8,511,419 B2 * | 8/2013 | Bando | .................. | B62D 5/0424 180/443 |
| 8,689,927 B2 * | 4/2014 | Yamamoto | ........... | B62D 5/0448 180/443 |
| 8,881,861 B2 * | 11/2014 | Tojo | ..................... | B62D 5/0424 180/444 |

(Continued)

FOREIGN PATENT DOCUMENTS

JP    2011-042268 A    3/2011

*Primary Examiner* — Joseph Rocca
*Assistant Examiner* — Michael Stabley
(74) *Attorney, Agent, or Firm* — Leason Ellis LLP

(57) ABSTRACT

A steering apparatus includes a motor, a rack shaft, a belt transmission mechanism that is provided with a drive pulley connected to the motor, a driven pulley, and a belt wrapped around the drive pulley and the driven pulley, and a converting member that is provided to extend along an axial direction of the rack shaft and that converts a rotational force of the driven pulley into a movement force in the axial direction of the rack shaft. The driven pulley is fastened and fixed to the converting member by a bolt, and the steering apparatus further includes a retaining member that prevents detachment of the bolt by restricting movement of a head of the bolt.

5 Claims, 5 Drawing Sheets

(56) References Cited

U.S. PATENT DOCUMENTS

| | | | | |
|---|---|---|---|---|
| 8,944,208 B2* | 2/2015 | Kitamura | B62D 5/0448 | 180/443 |
| 2005/0247514 A1* | 11/2005 | Heitzer | F16H 7/14 | 180/444 |
| 2012/0061164 A1* | 3/2012 | Budaker | B62D 5/0448 | 180/400 |
| 2013/0126261 A1* | 5/2013 | Jung | B62D 5/0421 | 180/444 |
| 2013/0161114 A1* | 6/2013 | Bando | B62D 5/04 | 180/443 |
| 2014/0260727 A1* | 9/2014 | Webber | B62D 5/0424 | 74/89.23 |
| 2014/0260728 A1* | 9/2014 | Holm | F16C 35/063 | 74/89.23 |
| 2014/0284133 A1* | 9/2014 | Muto | B62D 5/0448 | 180/444 |
| 2014/0345966 A1* | 11/2014 | Asakura | F16C 25/083 | 180/444 |
| 2015/0060187 A1* | 3/2015 | Yamaguchi | B62D 5/0448 | 180/444 |
| 2015/0060188 A1* | 3/2015 | Kitamura | B62D 5/0448 | 180/444 |

* cited by examiner

STEERING APPARATUS

CROSS-REFERENCE TO RELATED APPLICATIONS

This application is based on and claims priority under 35 USC 119 from Japanese Patent Application No. 2014-185806 filed on Sep. 12, 2014, the entire content of which is incorporated herein by reference.

BACKGROUND OF THE INVENTION

1. Technical Field

The present invention relates to a steering apparatus.

2. Related Art

A steering apparatus which transmits the output of a motor to a steering shaft (rack shaft) via a belt, is known (see, for example, Patent Literature 1 (JP-A-2011-42268)). In a steering apparatus of this kind, the output of the motor is transmitted to the rack shaft via a drive pulley, a belt, a driven pulley and a ball screw, which are coupled to an output shaft of the motor. The driven pulley is fastened and fixed by bolts to a nut of the ball screw.

SUMMARY OF THE INVENTION

In a structure in which a driven pulley is fastened and fixed by a bolt to the nut of a ball screw, it is desirable for the driven pulley not to be liable to fall off.

It is an object of the present invention to provide a steering apparatus in which the driven pulley is not liable to fall off.

In view of above, an aspect of the present invention provides a steering apparatus, comprising: a motor; a rack shaft; a belt transmission mechanism that is provided with a drive pulley connected to the motor, a driven pulley, and a belt wrapped around the drive pulley and the driven pulley; and a converting member that is provided to extend along an axial direction of the rack shaft and that converts a rotational force of the driven pulley into a movement force in the axial direction of the rack shaft, wherein the driven pulley is fastened and fixed to the converting member by a bolt, and the steering apparatus further comprises a retaining member that prevents detachment of the bolt by restricting movement of a head of the bolt.

According to the aspect of the present invention, the occurrence of detachment of a bolt which fixes a driven pulley is suppressed, and falling off of the driven pulley can be prevented.

DETAILED DESCRIPTION OF THE INVENTION

First Embodiment

Figure 1:
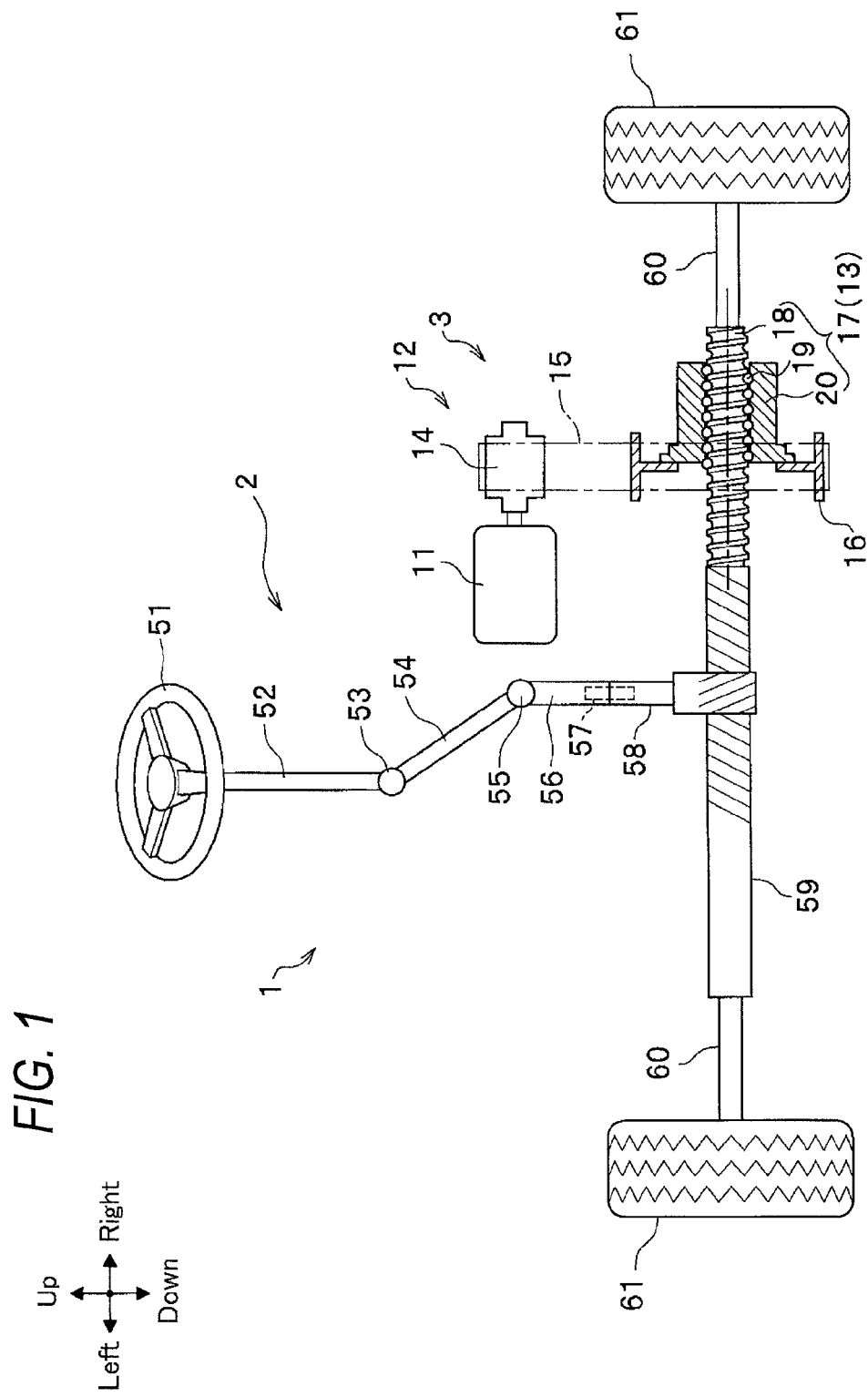
FIG. 1 is a schematic drawing of a steering apparatus of the present invention.

The steering apparatus 1 is an apparatus that is mounted in a vehicle and steers steerable wheels of a vehicle. As shown in FIG. 1, the steering apparatus 1 is a rack-assisted apparatus which is provided with a steering mechanism 2 having a rack shaft (steering shaft) 59 extending in the left/right direction, and an auxiliary torque mechanism 3 disposed at one end of the rack shaft 59. Below, the one end where the auxiliary torque mechanism 3 is disposed in the left/right direction of extension of the rack shaft 59 is called the right side and the other end thereof is called the left side.

The steering mechanism 2 is provided with: a steering wheel 51 which is operated by a driver; a steering shaft 52 which rotates in unison with the steering wheel 51; an upper coupling shaft 54 which is coupled to the steering shaft 52 via a universal joint 53; a lower coupling shaft 56 which is coupled to the upper coupling shaft 54 via a universal joint 55; a pinion shaft 58 which is coupled to the lower coupling shaft 56 via a torsion bar 57 and on a lower part of which is formed a pinion; and a rack shaft 59 in which rack teeth which mesh with the pinion are formed and to either end of which left and right front wheels 61 are coupled via tie rods 60. When the driver turns the steering wheel 51, the rack shaft 59 moves leftwards or rightwards, whereby the front wheels 61 can be steered.

The auxiliary torque mechanism 3 detects the torque applied to the steering wheel 51 with a torque sensor (not illustrated) and controls driving of the motor 11 by a control device (not illustrated) in accordance with the detected torque. Consequently, the torque generated by the motor 11 is transmitted as auxiliary force in addition to the operating force of the driver applied to the steering wheel 51, to the rack shaft 59, via a belt transmission mechanism 12 and a converting member 13, which are described hereinafter.

Figure 2:
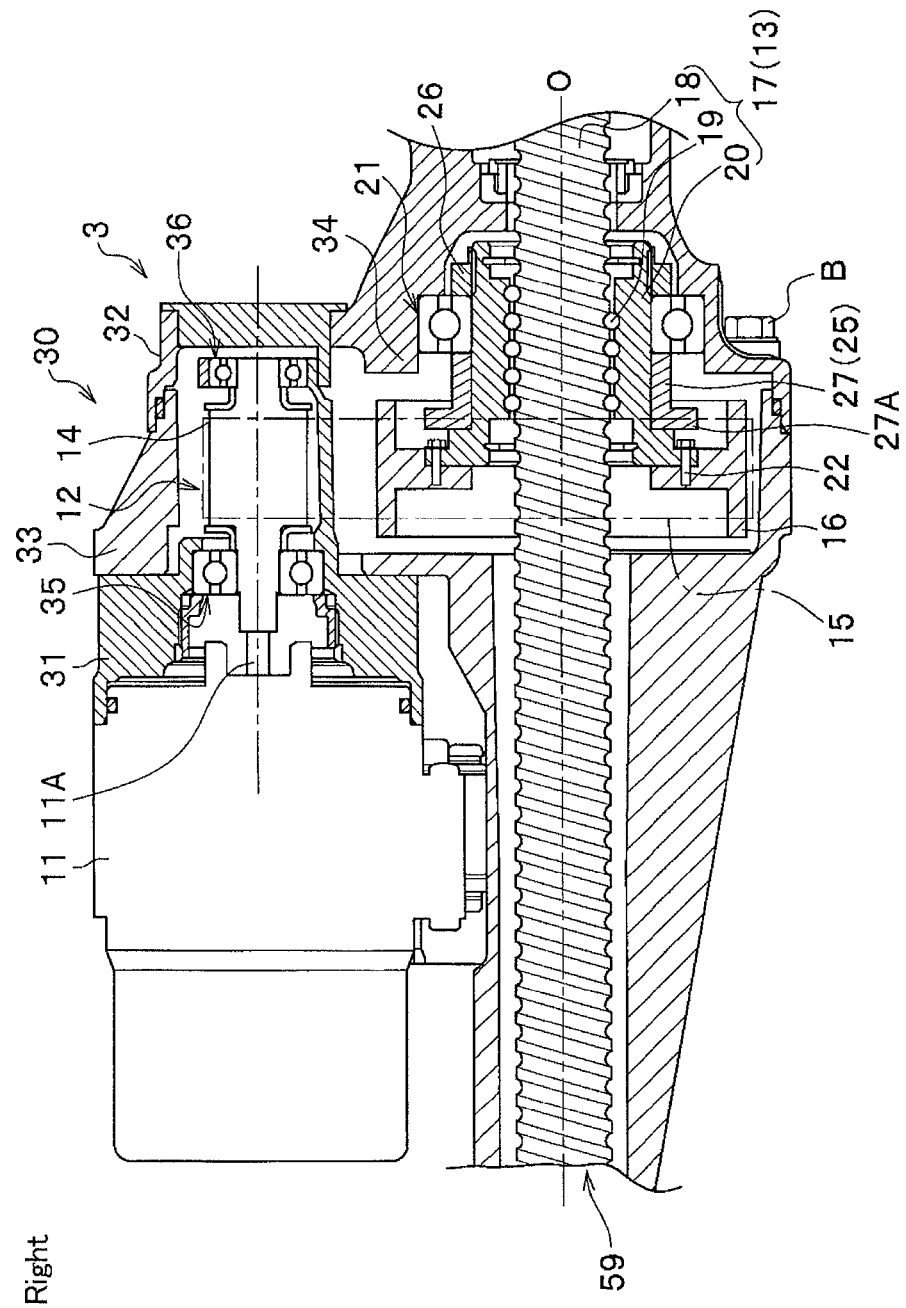
FIG. 2 is a cross-sectional illustrative diagram of the periphery of an auxiliary torque mechanism in a first embodiment of the invention.

Below, one example of an auxiliary torque mechanism 3 of the steering apparatus 1 is described with reference to FIG. 2. The auxiliary torque mechanism 3 is provided with a motor 11, a rack shaft 59, a belt transmission mechanism 12, a converting member 13, and a housing 30 which accommodates the belt transmission mechanism 12 and the converting member 13.

The housing 30 is configured so as to be split into a first housing 32 and a second housing 33 which are unified by a bolt B. A ring-shaped peripheral wall section 34 which surrounds the periphery of the inserted rack shaft 59 is formed in the first housing 32. A motor 11 is installed via a pulley holder 31 on the upper part of the second housing 33. The pulley holder 31 is fixed to the second housing 33 by a bolt (not illustrated).

[Belt Transmission Mechanism 12]

The belt transmission mechanism 12 is constituted of a drive pulley 14 which is connected to the motor 11, a driven pulley 16, and a belt 15 which is wrapped around the drive pulley 14 and the driven pulley 16. The drive pulley 14 is held axially on the output shaft 11A of the motor 11, and is supported on the pulley holder 31 via a pair of bearings 35, 36. The driven pulley 16 is installed on the converting member 13, as described below.

[Converting Member 13]

Figure 3:
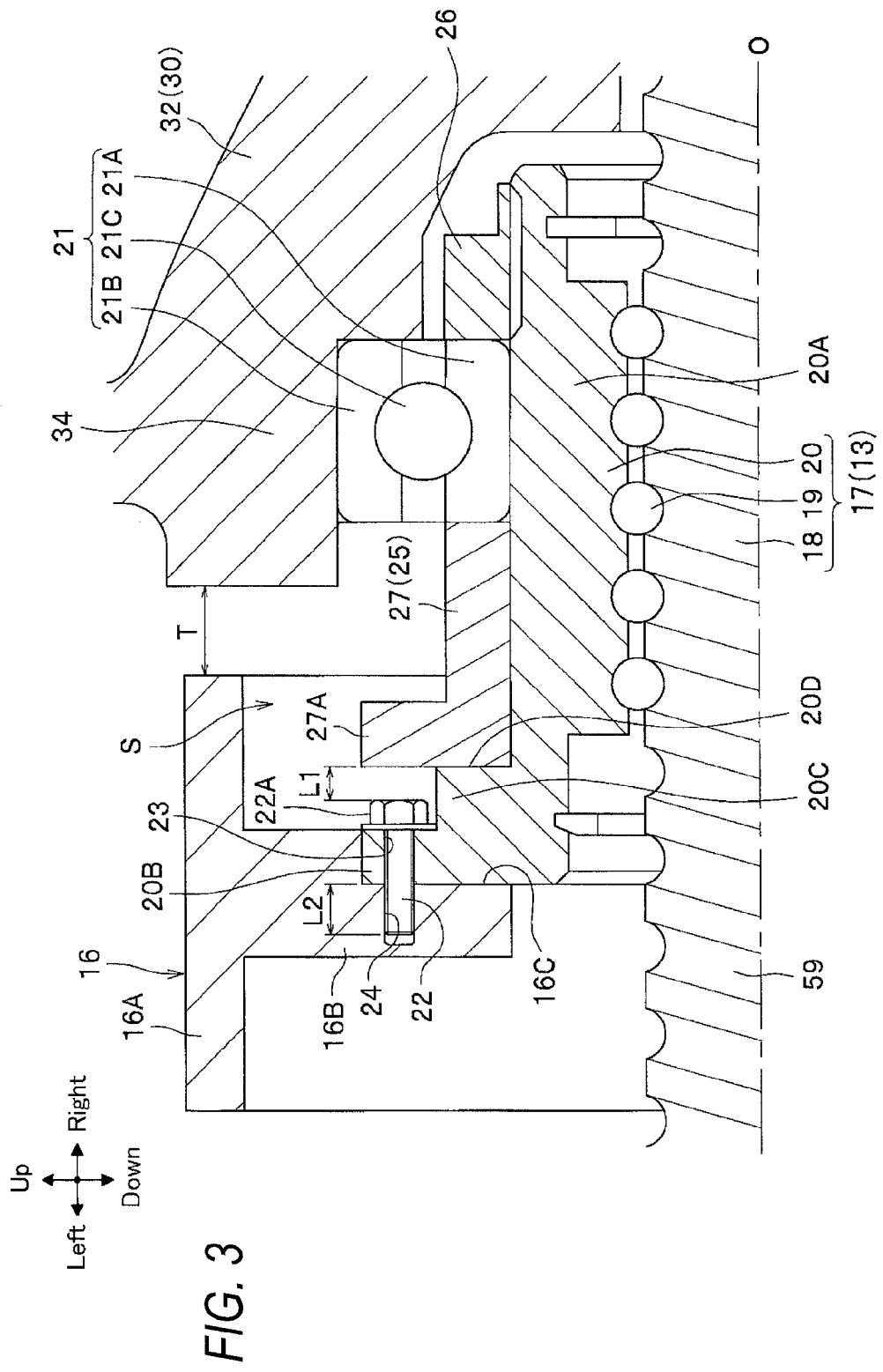
FIG. 3 is a partial enlarged diagram of FIG. 2.

The converting member 13 is a member which is provided extending along the axial O direction of the rack shaft 59 and has a function for converting the rotational force of the driven pulley 16 into a movement force in an axial direction of the rack shaft 59, and is constituted of a ball screw 17, for example. The ball screw 17 is constituted of a screw shaft section 18 which is formed on the rack shaft 59, a ball 19 and a nut 20. The nut 20 is supported on the first housing 32 via the bearing 21. As shown in FIG. 3, the bearing 21 is constituted of an inner ring 21A, an outer ring 21B and a ball 21C. The inner ring 21A is fitted externally onto the outer circumferential surface of the nut 20, and the outer ring 21B is inserted into the peripheral wall section 34 of the first housing 32.

As shown in FIG. 3, the driven pulley 16 is fastened and fixed to the ball screw 17 by a bolt 22 that is screwed into one end thereof in the axial direction of the ball screw 17 (the left-hand end), from the inner side of the axis O direction of the ball screw 17. The wording "a bolt 22 that is screwed . . . from the inner side of the axis O direction of the ball screw 17" means that the bolt 22 is screwed in a direction from the central portion of the axis O direction of the ball screw 17 towards one end portion of the ball screw 17.

A more concrete description of the present embodiment is given below. The nut 20 has a form which includes a main barrel section 20A formed in the axis O direction, a large-diameter flange section (called the "nut flange section") 20B which is formed in one end portion, and a step difference section 20C which is formed between the main barrel section 20A and the nut flange section 20B and has an outer diameter that is larger than the outer diameter of the main barrel section 20A and is smaller than the outer diameter of the nut flange section 20B. A plurality of bolt through holes 23 which pass through the nut flange section 20B in the axis O direction are formed about the axis O.

On the other hand, the driven pulley 16 is constituted of a groove cylinder section 16A in which a pulley groove is formed, and an internal flange section (installation seating) 16B which projects on the inner circumferential surface of the groove cylinder section 16A. The minimum interval T between the right end portion of the groove cylinder section 16A and the housing 30 has a very narrow dimension. A cutaway 16C into which an outer circumferential surface and a lateral end surface of the nut flange section 20B can be fitted is formed in the inner flange section 16B. A plurality of female screw threads 24 into which a bolt 22 is screwed are formed in the inner flange section 16B at positions corresponding to the bolt through holes 23.

From the foregoing, the driven pulley 16 is abutted against the outer end surface (left end surface) of the nut flange section 20B, in such a manner that the cutaway 16C and the nut flange section 20B are fitted together, and is then fastened and fixed to the nut flange section 20B by bolts 22, which are disposed in plural fashion in the circumferential direction about the steering axis, and which are screwed from the inner side in the axis O direction of the ball screw 17. As a result of this, the bolt heads 22A of the bolts 22 are positioned on the inner side of the axis O direction of the ball screw 17. More specifically, the bolts are positioned in a small space S enclosed by the driven pulley 16, the nut 20 and the housing 30.

[Retaining Member 25]

The steering apparatus 1 is provided with a retaining member 25 which prevents detachment of the bolts 22 by restricting the movement of the bolt heads 22A. The bearing 21 described above is located in position in the axial direction by sandwiching the inner ring 21A between a collar 27 which fits externally onto the main barrel section 20A of the nut 20, and a fixing nut 26 which is screwed onto the other end of the nut 20. One end of the collar 27 abuts against the step difference side face 20D of the step difference section 20C of the nut 20, and the other end thereof abuts against the inner ring 21A of the bearing 21. In the present embodiment, the collar 27 constitutes the retaining member 25. A flange section 27A is formed on one end of the collar 27. The outer diameter of the flange section 27A is substantially the same as the outer diameter of the nut flange section 20B, for example. The gap L1 between the bolt head 22A and the left end face of the flange section 27A is shorter than the thread dimension L2 of the bolt 22 and the female screw thread 24.

[Action]

When the motor 11 is driven, the driven pulley 16 is caused to rotate by the belt transmission mechanism 12. The screw shaft section 18 (rack shaft 59) moves in the axis O direction by a feed action, because the nut 20, to which the driven pulley 16 has been fastened and fixed, also rotates. Even supposing that a bolt 22 has become loose, since the gap L1 is set to be shorter than the thread dimension L2, then when the movement of the bolt head 22A is restricted due to the bolt head 22A abutting against the left end surface of the flange section 27A of the collar 27, the screwed-in state of the bolt 22 is maintained and the driven pulley 16 never becomes detached from the nut flange section 20B.

Furthermore, in the present embodiment, the driven pulley 16 is fastened and fixed by bolts 22 which is screwed into the nut 20 of the ball screw 17, which is a converting member 13, from the inner side in the axial direction of the nut 20, and the bolt head 22A is positioned in a space S which is enclosed by the driven pulley 16, the nuts 20 and the housing 30. By adopting this configuration, even if a bolt 22 becomes detached, the detached bolt 22 falls off towards the inner side of the axial direction of the ball screw 17. More specifically, since the minimum gap T between the right end portion of the groove cylinder section 16A of the driven pulley 16 and the housing 30 is formed to a narrow dimension as described above, then a bolt 22 which has fallen off will remain inside the narrow space S enclosed by the driven pulley 16, the housing 30 and the nut 20. Consequently, the bolt 22 never falls off to the outer side of the axial direction of the ball screw 17. Accordingly, contact between a bolt 22 which has fallen off and the rack shaft 59 can be prevented and the occurrence of noise due to such contact can be prevented.

Moreover, in the present embodiment, a bearing 21 is fitted externally onto the outer circumferential surface of the nut 20, and a collar 27 which serves to locate the bearing 21 in position in the axial direction is also installed onto the outer circumferential surface of the nut 20, this collar 27 serving as the retaining member 25, and therefore the collar 27 is able to perform both a function of locating the bearing 21 in position in the axial direction and a function of retaining the bolt 22.

Furthermore, in a case where the converting member 13 is a ball screw 17, by adopting a configuration in which the driven pulley 16 is fastened and fixed to the nut 20 of the ball screw 17 by bolts 22, it is possible to simplify the fastening structure based on bolts 22 between the driven pulley 16 and the converting member 13, and the assembly work can be carried out easily. In particular, by adopting a configuration in which a nut flange section 20B is formed at one end of the nut 20 of the ball screw 17 in the axial direction thereof, and the driven pulley 16 is fastened and fixed to the nut flange section 20B by bolts 22, it is possible to further simplify the fastening structure based on bolts 22 between the driven pulley 16 and the converting member 13, and the assembly work can be carried out easily.

Second Embodiment

Figure 4:
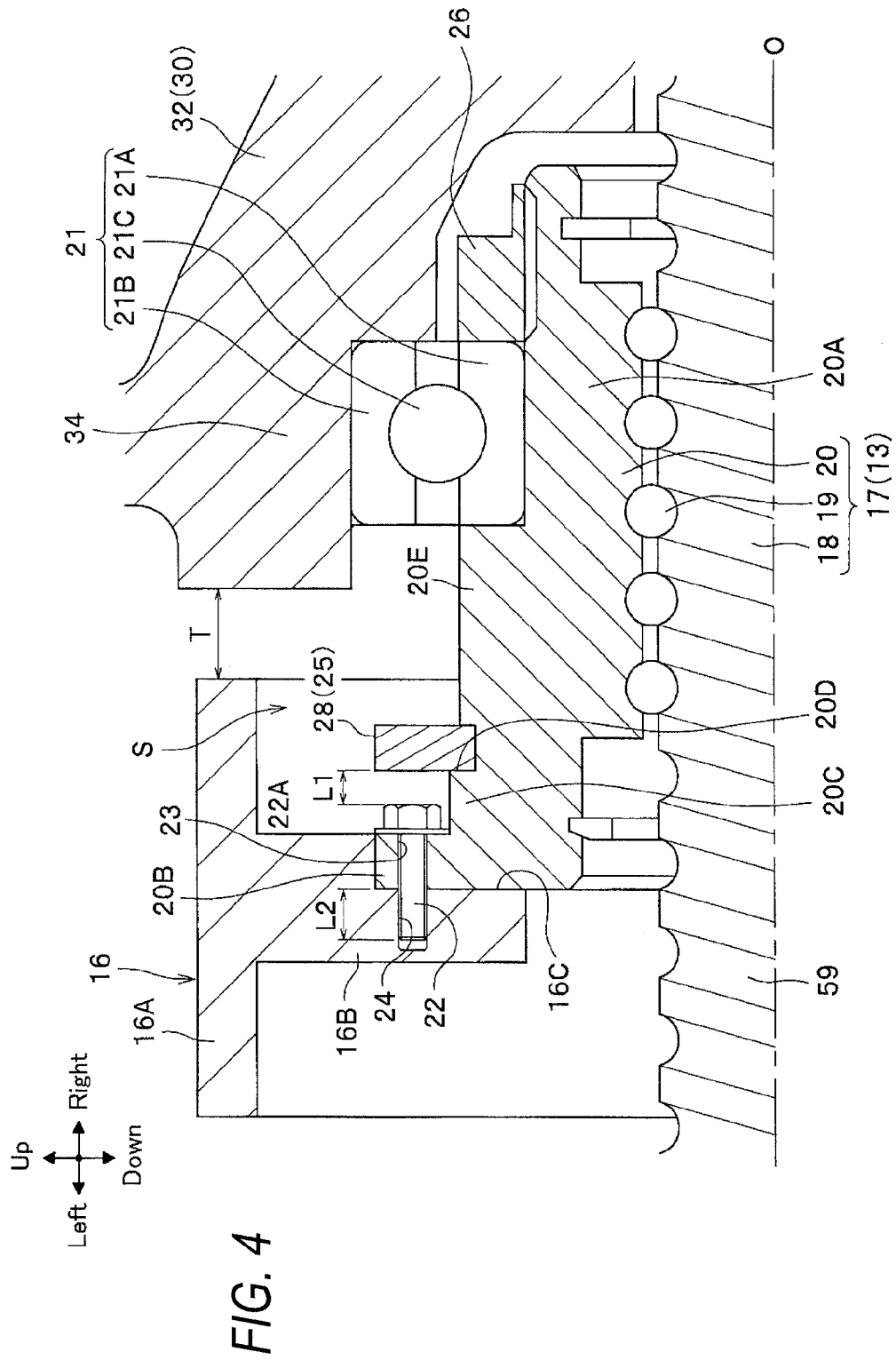
FIG. 4 is a cross-sectional illustrative diagram of the periphery of an auxiliary torque mechanism in a second embodiment of the invention.

A second embodiment is now described with reference to FIG. 4. In FIG. 4, constituent elements which are the same as the first embodiment are labelled with the same reference numerals, and description thereof is omitted here. The second embodiment relates to a case where the retaining member 25 is constituted of a snap ring 28. The snap ring 28 is, for example, a C-shaped eccentric retaining ring or a C-shaped concentric retaining ring, or the like. In this second embodiment, the bearing 21 is located in position in the axial direction by being sandwiched between a fixing nut 26, and a position locating projecting section 20E which is formed on the outer circumference of the nut 20. The snap ring 28 is fitted into a square-shaped groove which is formed by the step difference section 20C of the nut 20, the position locating projecting section 20E, and the outer circumferential surface of the main barrel section 20A. The gap L1 between the bolt head 22A and the left end face of the snap ring 28 is shorter than the thread dimension L2 of the bolt 22 and the female screw thread 24.

In this second embodiment also, even supposing that a bolt 22 has become loose, since the gap L1 is set to be shorter than the thread dimension L2, then when the movement of the bolt head 22A is restricted due to the bolt head 22A abutting against the left end surface of the snap ring 28, the screwed-in state of the bolt 22 is maintained and the driven pulley 16 never becomes detached from the nut flange section 20B.

Third Embodiment

Figure 5:
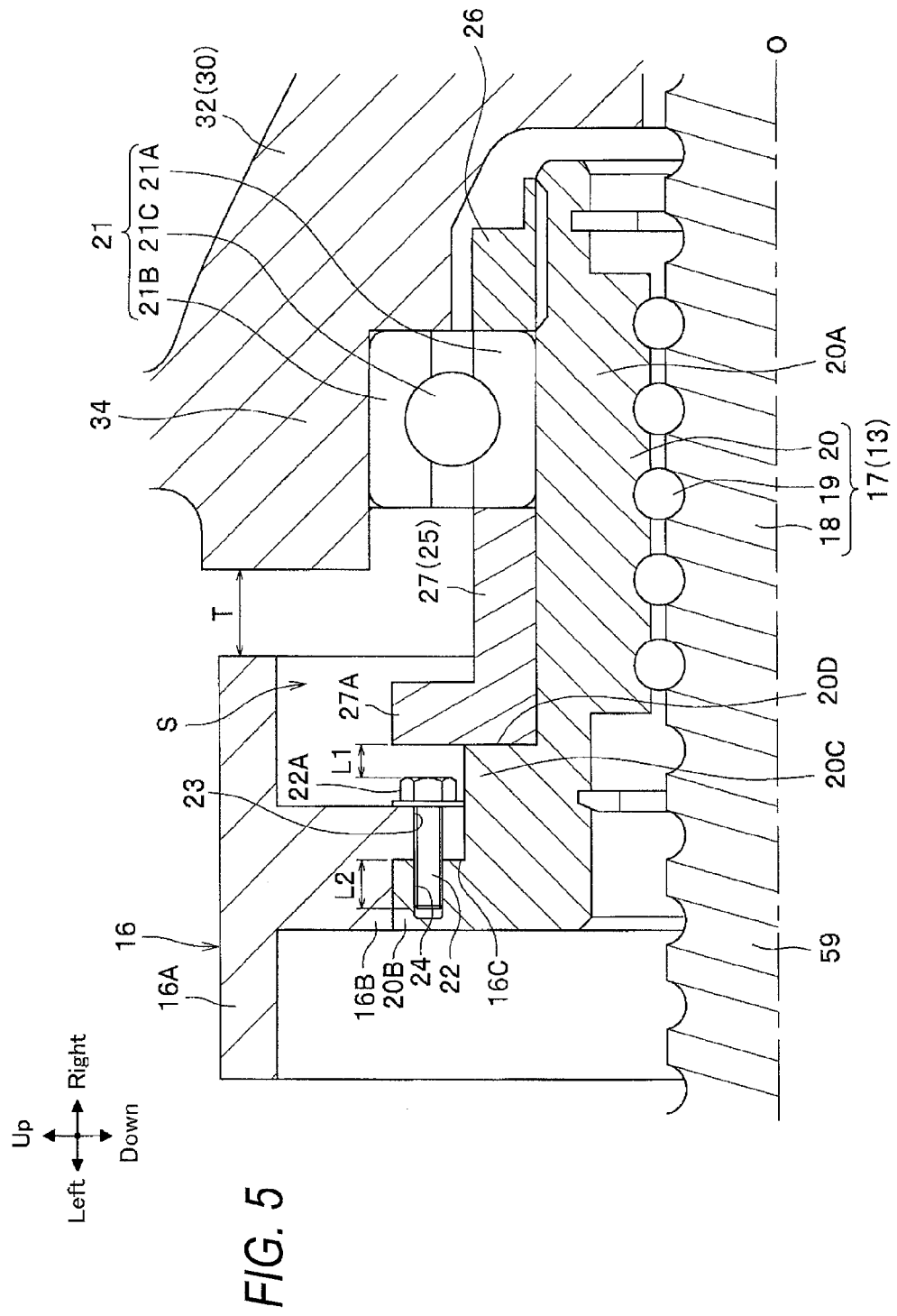
FIG. 5 is a cross-sectional illustrative diagram of the periphery of an auxiliary torque mechanism in a third embodiment of the invention.

A third embodiment is now described with reference to FIG. 5. In FIG. 5, constituent elements which are the same as the first embodiment are labelled with the same reference numerals, and description thereof is omitted here. In the first embodiment, the inner flange section 16B of the driven pulley 16 is abutted against the outer end face (left end face) of the nut flange section 20B and the two elements are fixed together by bolts 22, whereas in the third embodiment, the inner flange section 16B of the driven pulley 16 is abutted against the inner end face (right end face) of the nut flange section 20B and the two elements are fixed together by bolts 22.

In this third embodiment, the driven pulley 16 is fastened and fixed to the nut flange section 20B by bolts 22 which are screwed in from the inner side of the axis O direction of the ball screw 17, and the bolt heads 22A of the bolts 22 are positioned in a narrow space S enclosed by the driven pulley 16, the nut 20 and the housing 30. Therefore, bolt through holes 23 are formed in the driven pulley 16, and female screw threads 24 are formed in the nut flange section 20B of the nut 20.

According to this third embodiment, since the fastening position of the driven pulley 16 is towards the inner side of the axis O direction of the ball screw 17, from the nut flange section 20B, then it is possible to prevent the driven pulley from falling off, even more reliably.

Three preferred embodiments of the present invention were described above. The present invention can also be applied to a so-called steer-by-wire type of steering apparatus, in which a reactive actuator which applies an operational feel to the driver when operating the steering wheel, and a steering actuator which has a motor that drives the rack shaft, are electrically connected.

Furthermore, the described embodiments are rack and pinion systems, in which the rack shaft is configured by a rack shaft 59, but apart from this, for example, it is also possible to adopt a configuration in which the steering apparatus 1 is a ball nut member, and the rack shaft is a screw rod that moves reciprocally due to rotation of the nut.

Furthermore, the converting member 13 is not limited to being a ball screw 17, provided that the converting member has a function for converting rotational force of the driven pulley 16 into a movement force in the axial direction of the rack shaft. For example, it is also possible to adopt a configuration in which the rack shaft moves in the axial direction, by forming a spiral groove in the rack shaft, providing a round cylindrical slider having a projecting section which fits into this spiral groove, and causing the projecting section to slide inside the spiral groove when the slider is rotated.

Furthermore, the retaining member 25 is not limited to the collar 27 or snap ring 28, provided that the member is positioned in the opposite direction to the direction of insertion of the bolt 22 into the bolt through hole 23 and has a function for preventing detachment of the bolt 22 by restricting movement of the bolt head 22A. For example, the retaining member 25 may be fixed to the outer circumferential surface of the converting member 13 (the nut 20) by another ring-shaped member, or by pressure-fitting, welding or the like.

What is claimed is:

1. A steering apparatus comprising:
   a motor;
   a rack shaft;
   a belt transmission mechanism that is provided with a drive pulley connected to the motor, a driven pulley, and a belt wrapped around the drive pulley and the driven pulley; and
   a converting member that is provided to extend along an axial direction of the rack shaft and that converts a rotational force of the driven pulley into a movement force in the axial direction of the rack shaft, wherein
   the driven pulley is fastened and fixed to the converting member by a bolt,
   the steering apparatus further comprises a retaining member that prevents detachment of the bolt by restricting movement of a head of the bolt;
   a bearing that is fitted externally to an outer circumferential surface of the converting member; and
   a collar that is fitted externally to the outer circumferential surface of the converting member and that positions the bearing in the axial direction, wherein
   the retaining member is the collar.

2. The steering apparatus according to claim 1, wherein the driven pulley is fastened and fixed to the converting member by the bolt that is screwed into the converting member and the driven pulley from an inner side of the converting member in the axial direction of the converting member, and
   the head of the bolt is positioned in a space enclosed by the driven pulley, the converting member and a housing supporting the converting member.

3. The steering apparatus according to claim 1, wherein the converting member is a ball screw, and
   the driven pulley is fastened and fixed to a nut of the ball screw by the bolt.

4. The steering apparatus according to claim 3, wherein the nut of the ball screw has a nut flange section formed in one end in the axial direction of the nut of the ball screw, and
   the driven pulley is fastened and fixed to the nut flange section by the bolt.

5. The steering apparatus according to claim 1, wherein a plurality of bolts are disposed in a circumferential direction around the rack shaft.

* * * * *